(12) United States Patent
Millar

(10) Patent No.: US 7,096,906 B2
(45) Date of Patent: Aug. 29, 2006

(54) TIRE CHAIN ATTACHMENT APPARATUS AND METHOD

(75) Inventor: Robert Walter Millar, Eureka, MT (US)

(73) Assignee: Hughes -Millar Holdings, LLC, Sedona, AZ (US)

( * ) Notice: Subject to any disclaimer, the term of this patent is extended or adjusted under 35 U.S.C. 154(b) by 32 days.

(21) Appl. No.: 10/391,028

(22) Filed: Mar. 17, 2003

(65) Prior Publication Data

US 2004/0182488 A1    Sep. 23, 2004

(51) Int. Cl.
*B60C 11/00*    (2006.01)
*B60C 27/00*    (2006.01)

(52) U.S. Cl. .................................... 152/241; 152/213 R

(58) Field of Classification Search ............ 152/213 R, 152/216–217, 213 A, 219, 222, 233, 231, 152/239, 241, 218
See application file for complete search history.

(56) References Cited

U.S. PATENT DOCUMENTS

| 1,929,026 A | * | 10/1933 | Marcil | 81/15.8 |
|---|---|---|---|---|
| 2,333,877 A | | 11/1943 | Murphy et al. | 81/15.8 |
| 2,655,972 A | | 10/1953 | Doney | 152/213 |
| 2,826,232 A | * | 3/1958 | Korn | 152/217 |
| 3,242,963 A | | 3/1966 | Rietveld | 152/213 |
| 3,244,036 A | | 4/1966 | Smith-Miller | 81/15.8 |
| 3,722,330 A | | 3/1973 | Smekens | 81/15.8 |
| 4,794,823 A | | 1/1989 | Nakajima | 81/15.8 |
| 4,836,258 A | * | 6/1989 | Ellis | 152/213 A |
| 4,922,982 A | * | 5/1990 | Metraux | 152/216 |
| 5,236,026 A | * | 8/1993 | Springer | 152/241 |
| 5,785,783 A | * | 7/1998 | Thioliere | 152/216 |
| 6,047,754 A | * | 4/2000 | Drum | 152/213 R |

* cited by examiner

*Primary Examiner*—Jason R. Bellinger
(74) *Attorney, Agent, or Firm*—Knobbe Martens Olson & Bear

(57) ABSTRACT

A method and apparatus is provided for attaching a tire chain to a vehicle tire without necessarily crawling under the vehicle. Two members are connected to a tire chain. The members are then drawn together using a tensioning device, which allows connection of the tire chain.

19 Claims, 16 Drawing Sheets

TIRE CHAIN ATTACHMENT APPARATUS AND METHOD

FIELD OF THE INVENTION

The present invention relates to an apparatus and method for putting tire chains on tires.

BACKGROUND OF THE INVENTION

Attaching a tire chain onto the tire of a motor vehicle is often an extremely difficult and messy process. A major difficulty with attaching a tire chain is trying to connect the inner chain links, those on the far side of the tire. This can often require crawling under the fender of the motor vehicle alongside a busy road during a howling snowstorm. In addition, once the tire chains are attached to the tires, they are invariably loose and require a second roadside stop for retightening. Tire chain mounting devices have been developed that attempt either to obviate the need for attaching the inner links or to align the inner links to make the attachment simpler. Each of those devices has disadvantages, though, and none has been adopted widely in the marketplace.

SUMMARY OF THE INVENTION

One aspect of the present invention provides a tire chain application device that is simple to construct, relatively lightweight, and easy to use. Another aspect of the present invention provides a method for quickly attaching tire chains that is extremely simple and can be performed while kneeling, without necessarily crawling under the motor vehicle in the snow.

The first step is to lay the tire chain over the tire. The user of the tire chain application device pulls one end of the tire chain away from the tire such that the inner links are easily visible, attaches the short end of a J-shaped crossover to the inner link of the tire chain right next to the crossing traction chain, and then attaches the outer link of the tire chain, right next to the same crossing traction chain, to another point on the same J-shaped crossover. The crossover is then wedged between the tire and the snow. The user then repeats the process on the other end of the tire chain with a second J-shaped crossover. The crossovers are then securely clamped together by a knob.

The user then hooks one end of a long resilient strap to one of the crossovers. The user wraps the strap over a roller on that crossover, stretches and wraps the strap around a second roller on the other crossover, stretches and wraps the strap around the first roller again, and finally stretches and hooks the other end of the stretched strap to the knob that holds the two crossovers together. In an alternative embodiment the user attaches a shorter strap to the first roller itself, stretches and wraps the strap around the second roller, then stretches and wraps the strap around the first roller, and finally stretches and hooks the other end of the stretched strap to the knob that holds the two crossovers together. Because the strap is stretched in either embodiment as it is wrapped around the rollers, it puts tension on the crossovers, such that when the car is moved and the tire rotates approximately 45 degrees, the two crossovers are pulled together from a spread-open position into a collapsed position.

When the two crossovers are pulled together, the inner links of the tire chain are placed in general alignment for attachment. The crossovers hold the inner tire chain links above the top of the snow, so the user can then get out of the vehicle, kneel down, reach behind the tire, and attach the inner links without either fumbling for the connectors or crawling underneath the fender of the car in the ice and snow to see the tire chain's inner links. The places where the tire chain's inner links attach to the crossovers are specially shaped to put the inner links of the tire chain in the proper orientation for easy attachment. In addition, the tire chain attachment device has a special angle to keep the inner tire links roughly ¾" away from the inside of the tire, to allow for the expansion of the tire as it is compressed by the ground. Once the tire chain's inner links are connected, it is a simple matter to unhook and remove the crossovers and connect the tire chain's outer links, creating a very secure attachment of the tire chain to the tire. The tire chains are attached securely enough that there is no need for the driver to stop a second time to retighten them. The tire chain attachment device may then be applied to the opposite tire, and then be put away until it is needed again.

The tire chain application device has the ability to fit a wide range of tire widths. The device includes slots and hardware at the bottom of the crossovers. The slots and hardware allow the user to pre-adjust the crossovers to the appropriate tire width before the device is needed. dr

BRIEF DESCRIPTION OF THE DRAWINGS

These and other features, aspects and advantages of the present invention will now be described with reference to the drawings of several preferred embodiments, which embodiments are intended to illustrate and not to limit the invention.

DETAILED DESCRIPTION OF THE PREFERRED EMBODIMENT

Figure 1:
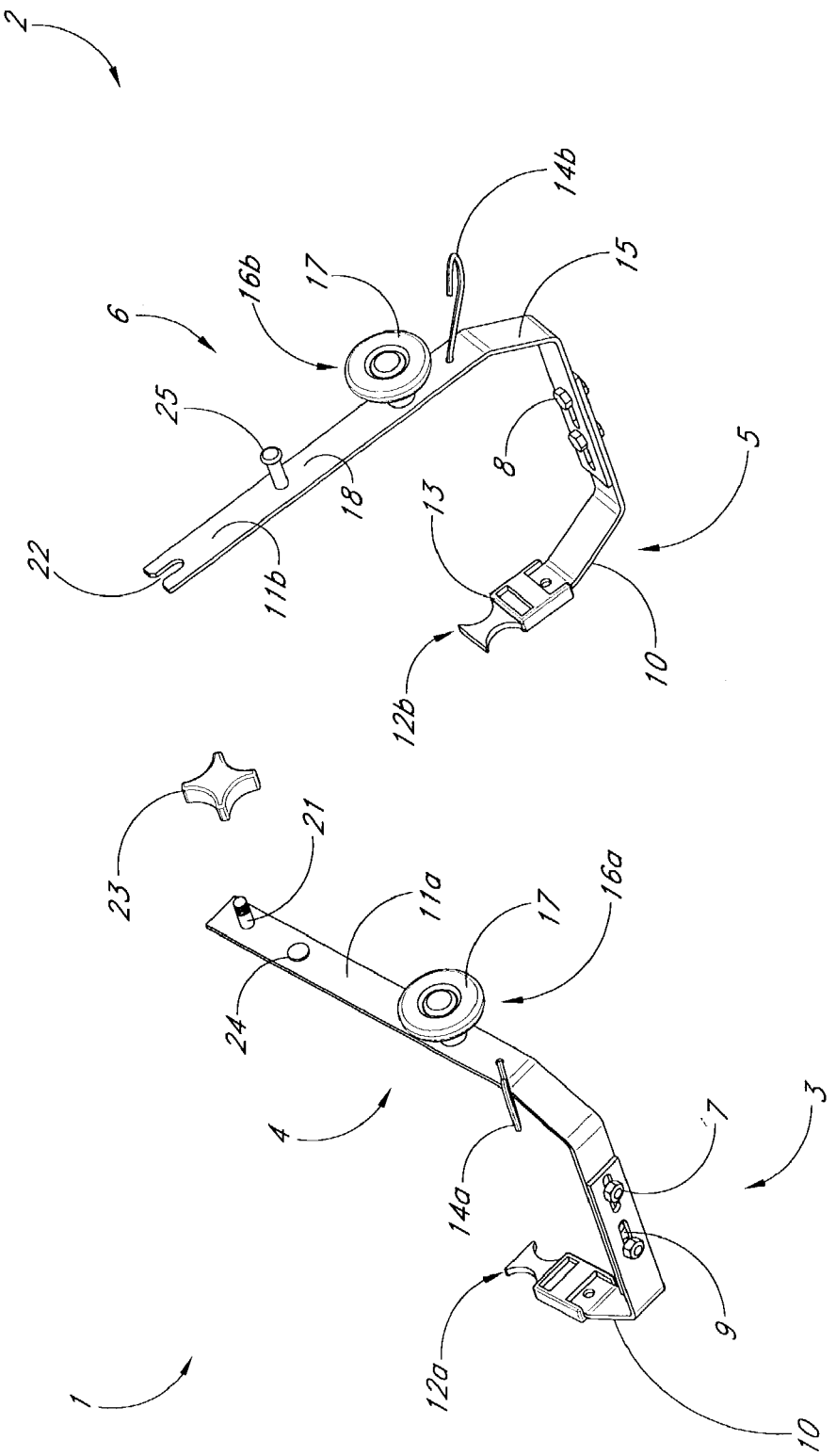
FIG. 1 illustrates in an exploded view the two J-shaped crossover members of one embodiment of the invention and the tightening assembly before the tension strap is attached.
Figure 2:
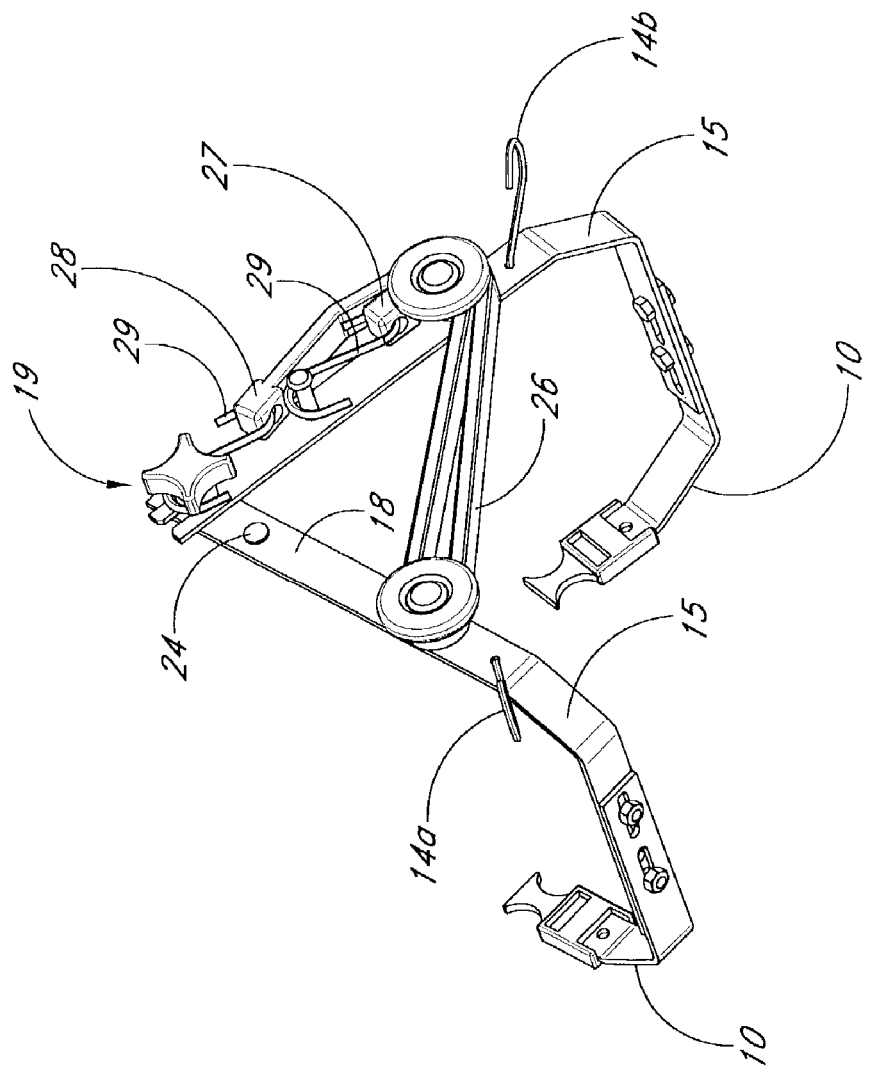
FIG. 2 illustrates in an isometric view the two J-shaped crossover members and the tightening assembly after the tension strap is attached.

As shown in FIGS. 1 and 2, one embodiment of the invention includes the first and second generally J-shaped crossover members 1 and 2. Although the first and second J-shaped crossover members 1 and 2 are generally similar and thus will be discussed in most respects together, the differences between the first and second J-shaped crossover members 1 and 2 will be discussed below. In the embodiment of the invention shown, the first and second J-shaped crossover members 1 and 2 may be advantageously constructed as a combination of adjustably secured pieces, such that the width of the first and second J-shaped crossover members 1 and 2 may be adjusted to fit the width of the vehicle's tire. Thus, as shown in FIG. 1, the first J-shaped crossover member 1 may be advantageously constructed as an inner member 3 and an outer member 4, and the second J-shaped crossover member 2 may be advantageously constructed as an inner member 5 and an outer member 6. The inner members 3 and 5 may be adjustably secured to the outer members 4 and 6 with combinations of nuts 7 and bolts 8 disposed in elongated slots 9, or with other connecting hardware well known in the art.

In an alternative embodiment, the first and second J-shaped crossover members 1 and 2 each may be advantageously constructed as a single piece of material. In another alternative embodiment, the first and second J-shaped crossover members 1 and 2 each may be advantageously constructed as a combination of adjustably secured pieces, such that the height of the J-shaped crossover members may be adjusted to fit the diameter of a vehicle's tire. In yet another alternative embodiment, the first and second J-shaped crossover members 1 and 2 each may be advantageously constructed as a combination of adjustably secured pieces, such that both the height and the width of the J-shaped crossover members may be adjusted to fit the diameter and width of the vehicle's tire.

Whether advantageously constructed as single or multiple pieces, each of the first and second J-shaped crossover members 1 and 2 advantageously includes a short end portion 10 and a long end portion 11. At or near the short end portions 10, the first and second J-shaped crossover members 1 and 2 include, respectively, the inner link attachment members 12a and 12b. In the embodiment depicted in FIG. 1, the inner link attachment members 12a and 12b are hourglass cross-sectional shaped portions. The inner link attachment members 12a and 12b may be part of the J-shaped crossover members 1 and 2 or may be separate pieces attached to the J-shaped crossover members 1 and 2. In either embodiment, a flange 13 may be formed directly below the attachment portions 12a and 12b. The inner link attachment members 12a and 12b are suitably adapted to engage links of a tire chain, and the flange 13 is suitably adapted to prevent links of a tire chain from slipping off of the inner link attachment members 12a and 12b.

As shown in FIGS. 1 and 2, the first and second J-shaped crossover members 1 and 2 further include the chain-retaining members 14a and 14b protruding from the lower front portion 15 of the J-shaped crossover members 1 and 2 and suitably adapted to engage links of a tire chain. In addition, the first and second protruding tension strap wrapping members 16a and 16b protrude from the lower front portions 15 of, respectively, the first and second, J-shaped crossover members 1 and 2. In the embodiment depicted in FIG. 1, the protruding wrapping members 16a and 16b each include a large diameter washer-like portion 17 spaced separately from the front surface 18 of J-shaped crossover members 1 and 2. In the preferred embodiment, the large diameter washer-like portions 17 are approximately parallel to the planes formed by the front surfaces 18 of the J-shaped crossover members 1 and 2.

As also depicted in FIGS. 1 and 2, the first and second J-shaped crossover members 1 and 2 are advantageously connectable at or near their respective long end portions 11a and 11b at a pivot axis by the tightening assembly 19. In one preferred embodiment, a threaded pin 21 is attached to the long end portion 11a of first J-shaped crossover member 1, and the long end portion 11b of the second J-shaped crossover member 2 includes a notch portion 22, such that the threaded pin 21 fits into the notch portion 22. In this embodiment, best shown in FIG. 1, the tightening assembly 19 is composed of a threaded knob 23 screwed onto threaded pin 21, and the pivot axis is defined through threaded pin 21.

In an alternative embodiment not shown, the long end 11a of the J-shaped crossover member 1 includes a hole portion, such that a bolt can fit through the hole portion and into the notch portion 22. In this embodiment, the tightening assembly 19 is advantageously constructed as a wing nut portion and bolt portion that are designed such that the bolt portion can be passed through the hole portion of the J-shaped crossover member 1 and attached to the wing nut portion. The tightening assembly 19 may be composed of any of various types of hardware well known in the art that allows the first J-shaped crossover member 1 to be connected to and tightened against the second J-shaped crossover member 2.

FIGS. 1 and 2 further depict a bump portion 24 protruding from an upper front portion 23 of the first J-shaped crossover member 1, and a protruding tension strap attachment portion 25 protruding from the upper front portion 23 of second J-shaped crossover member 2. The bump portion 24 is raised slightly from the front surface 18 of first J-shaped crossover member 1, and it is designed to engage the second J-shaped crossover member 2. In one preferred embodiment, the bump portion 24 is located approximately one inch away from the tightening assembly 19, and the protruding attachment portion 25 is located approximately midway between the tightening assembly 19 and the protruding wrapping member 16, although those of skill in the art will appreciate that the bump portion 24 and the protruding attachment portion 25 may be at different locations.

The embodiment of the invention shown in FIG. 2 further includes a tension strap 26. In one embodiment, the tension strap 26 is made out of rubber, but any other similarly stretchy yet resilient material is of course also acceptable. Rubber is presently preferred for its resistance to road salt and other environmental elements encountered during use; however, tension also may be provided in another way, for example by a spring or by a crank-type device. As depicted in one embodiment in FIG. 2, the tension strap 26 includes a first end portion 27 and a second end portion 28. The first and second end portions 27 and 28 of the tension strap 26 are designed to be attachable to the tightening assembly 19 and the protruding attachment portion 25 on the second J-shaped crossover member 2. It is preferable that each of the first and second end portions 27 and 28 of the tension strap 26 be designed to be attachable either to the tightening assembly 19 or to the protruding attachment portion 25. In another embodiment, the tension strap 26 could be designed such that the first end portion 27 would attach only to one of either the tightening assembly 19 or the protruding attachment portion 25, and the second end portion 28 could be similarly designed. The tension strap 26 also may be attached to the tightening assembly 19 and to the protruding attachment portion 25 in any of various diverse ways. In the preferred embodiment depicted in FIG. 2, the first and second end portions 27 and 28 of the tension strap 26 each include hook portions 29. In another embodiment, one or both of the first and second end portions 27 and 28 of the tension strap 26 may include a loop portion.

Figure 14:
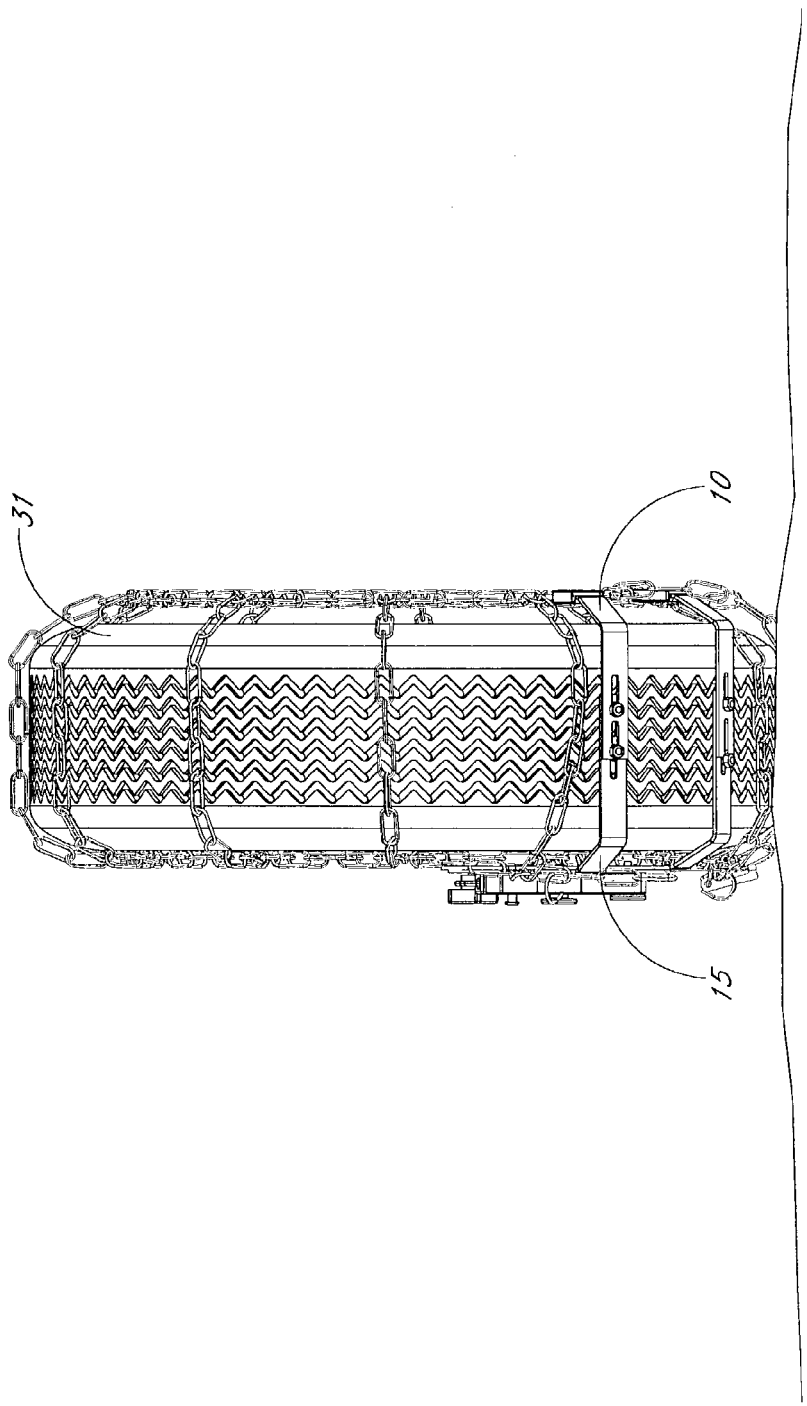
FIG. 14 illustrates in an end elevation the front or rear of a motor vehicle wheel and the positions of the two J-shaped crossover members after the motor vehicle wheel has been rotated approximately 30 degrees and the crossovers have collapsed.
Figure 14A:
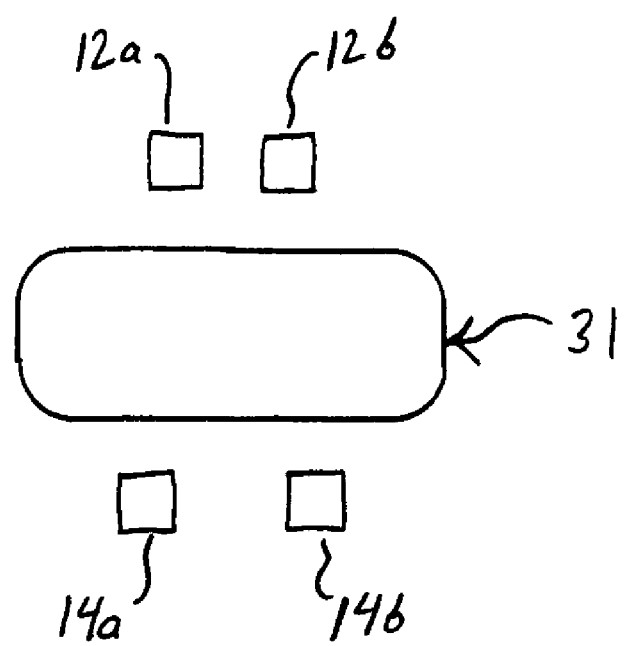
FIG. 14A is a schematic plan view of the tire with the J-shaped crossover members attached, as viewed from the direction identified by arrow 14A in FIG. 12.
Figure 14B:
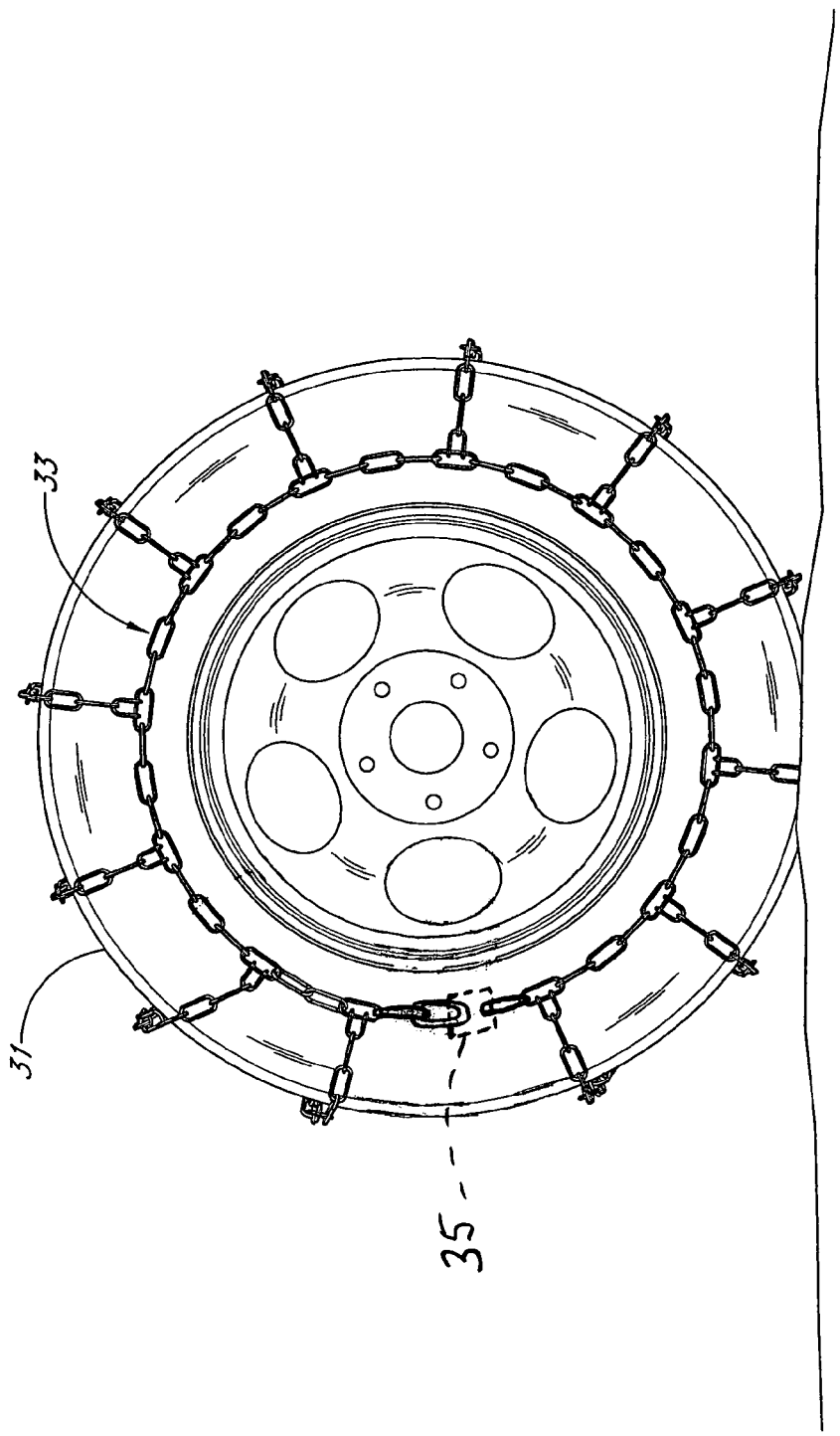
FIG. 14B is a side elevation the inside of a motor vehicle wheel and the positions of the two J-shaped crossover members shown in FIG. 13. with the ends of the tire chain connected and the J-shaped crossover members removed.

Referring now to FIGS. 2 and 14, in the preferred embodiment of the invention the first and second J-shaped crossover members 1 and 2 each have a slight angle at the lower front portion 15 and another slight angle near the short end 10. The angles help grab the tire 31 and also keep the hook-type member portions 14a and 14b about ¾" away from the tire 31, which desirably provides ample room for a person to attach the inner links after operation of the device.

Method of Using the Apparatus to Attach a Tire Chain

Figure 4:
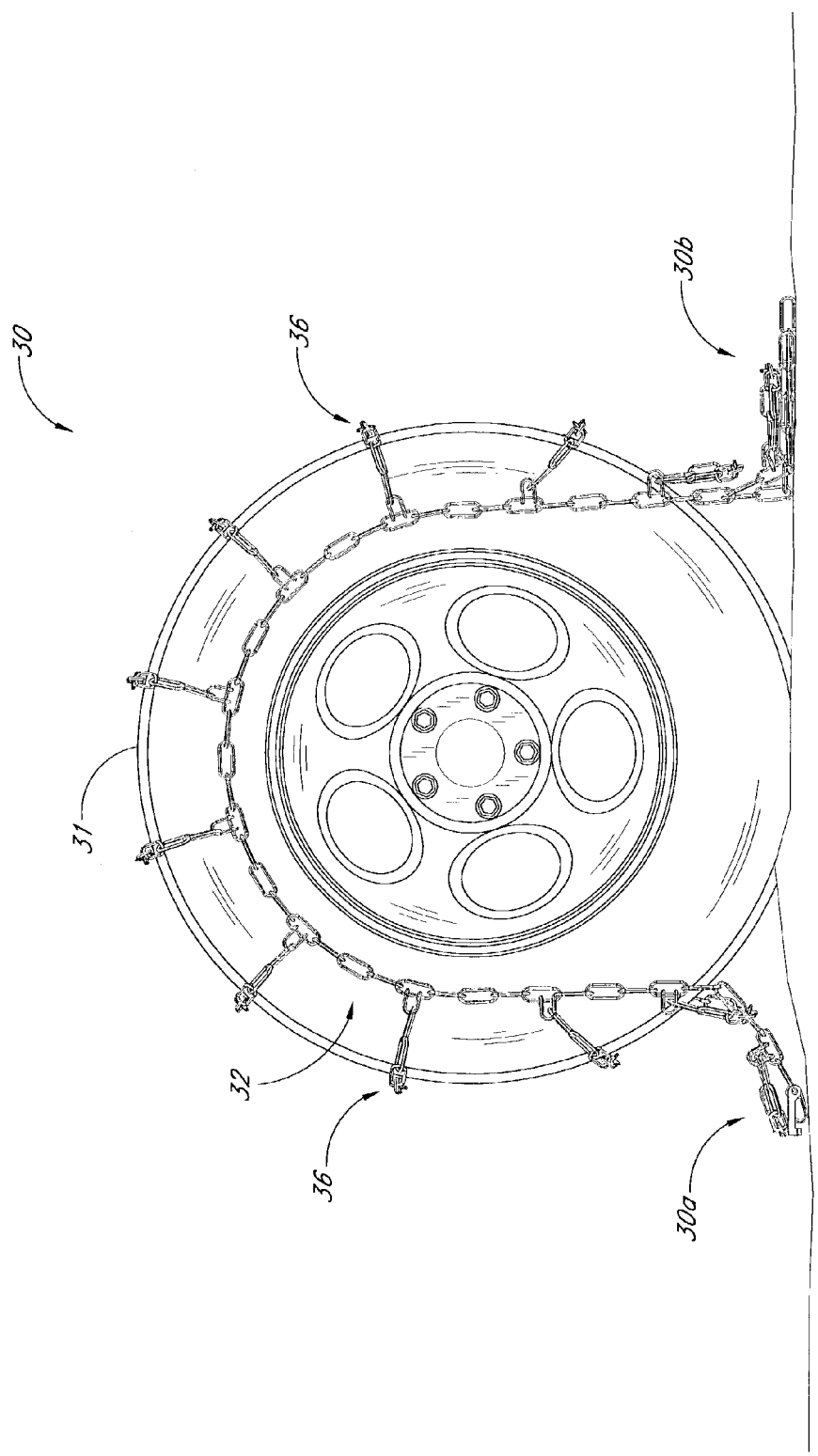
FIG. 4 illustrates in a side elevation a motor vehicle wheel with the unmounted tire chain of FIG. 3 before the embodiment of the invention shown in FIGS. 1 and 2 is attached to the chain.

The operation of one embodiment of the invention is illustrated in FIGS. 5 through 13. First, the tire chain 30 is placed over the tire 31, as depicted in FIG. 4. Although both sides of the tire 31 are shown respectively in the figures as though the tire and rim are off the motor vehicle for best illustrating attachment of the tire chain, it will be understood that the normal use of the embodiments of the invention will be when the tire 31 and rim are attached to the motor vehicle and the inner side of the tire 31 (shown in FIGS. 6 and 13) will not be easily accessible to the user.

Figure 3:
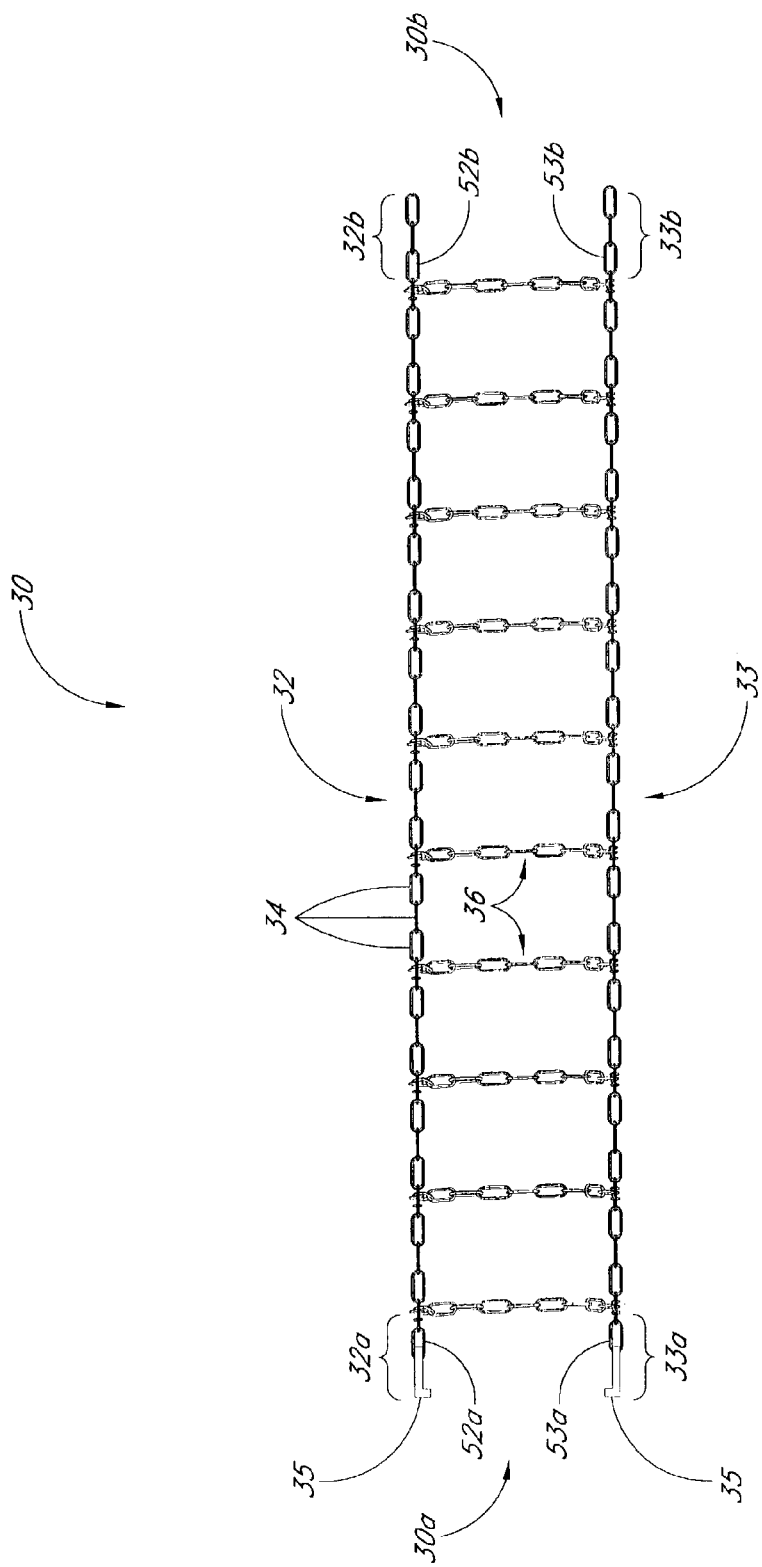
FIG. 3 illustrates in a side elevation an unmounted motor vehicle tire chain.

The tire chain 30 generally is of typical tire chain design as best illustrated in FIG. 3, and it includes an outer circumferential portion 32 and an inner circumferential portion 33, connected by a plurality of traction chain portions 36. The outer circumferential portion 32, inner circumferential portion 33, and traction chain portions 36 are each made up of a plurality of chain links 34. The tire chain 30 has two tire chain end portions 30a and 30b, and thus the outer circumferential portion 32 and the inner circumferential portion 33 each have two opposing end portions a and b. The outer circumferential portion 32 includes outer attachment links 52a and 52b, which are the chain links 34 closest to the respective endmost traction chain portion 36. The inner circumferential portion 33 includes inner attachment links 53a and 53b, which are the chain links 34 closest to the respective endmost traction chain portion 36. As is typical of tire chains, the opposing end portions 32a and 33a each include a tire chain hook 35.

After the tire chain 30 is placed over the tire 31, the user may begin with either of the tire chain ends 30a or 30b. The user may also begin with either of the first and second J-shaped crossover members 1 and 2. Although it will be understood that the attachment method can begin with either end of the tire chain 30, and with either of the J-shaped crossover members 1 and 2, for simplicity only one order of the method will be fully described in detail. Thus, in the order illustrated, the user begins with the tire chain end 30a and with the first J-shaped crossover member 1.

Holding the first J-shaped crossover member 1 in one hand, with the other hand the user lifts the tire chain end 30a up and away from the tire 31, such that the opposing end portion 33a of the inner circumferential link portion 33 is readily visible. The user attaches the inner attachment link 53a to the inner link attachment portion 12a on the J-shaped crossover member 1. Releasing the tire chain end 30a, the user then attaches the outer attachment link 52a to the chain-retaining member portion 14a on the J-shaped crossover member 1. The user then slides the J-shaped crossover member 1 under the tire 31 such that the J-shaped crossover member 1 is supported between the tire 31 and the ground or snow, as illustrated in FIGS. 5 and 6.

The user then repeats the same process for the other J-shaped crossover member and the other end of the tire chain 30. Thus, holding the second J-shaped crossover member 2 in one hand, with the other hand the user lifts the tire chain end 30b up and away from the tire 31, such that the opposing end portion 33b of the inner circumferential link portion 33 is readily visible. The user attaches the inner attachment link 53b to the inner link attachment portion 12b on the second J-shaped crossover member 2. Releasing the tire chain end 30b, the user then attaches the outer attachment link 52b to the chain-retaining member portion 14b on the J-shaped crossover member 2. The user then slides the J-shaped crossover member 2 under the tire 31 such that the J-shaped crossover member 2 is supported between the tire 31 and the ground or snow, as illustrated in FIGS. 5 and 6.

Figure 5:
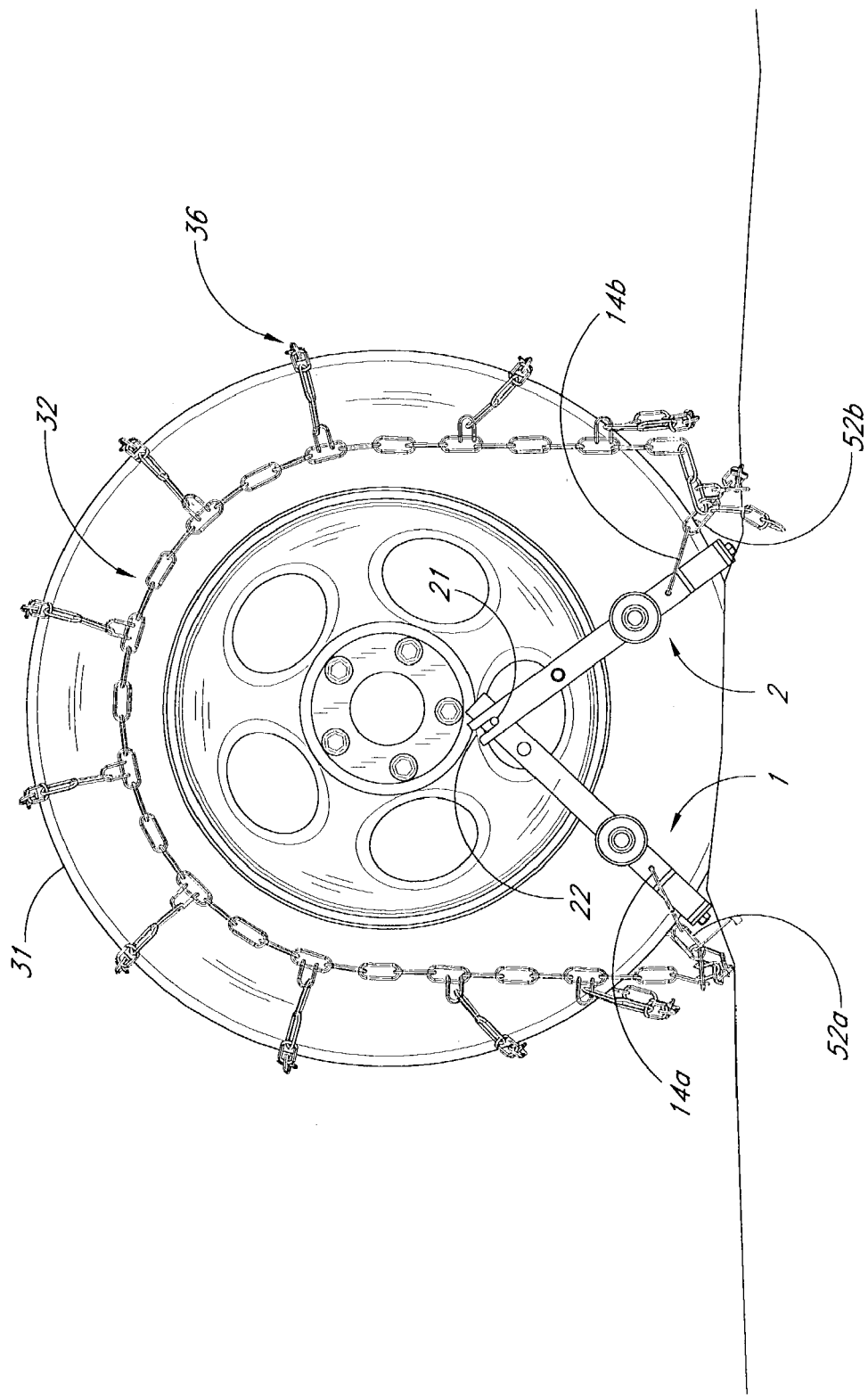
FIG. 5 illustrates in a side elevation the outside of a motor vehicle wheel and the positions of the two J-shaped crossover members after the embodiment shown in FIGS. 1 and 2 is attached to the tire chain, but before the tightening assembly is attached.

FIG. 5 illustrates the outer view of the tire 31, after the outer attachment links 52a and 52b have been attached to the chain-retaining member portions 14a and 14b as described above, and FIG. 6 illustrates the inner view of the tire 31, after the outer attachment links 53a and 53b have been attached to the attachment portions 12a and 12b.

Figure 6:
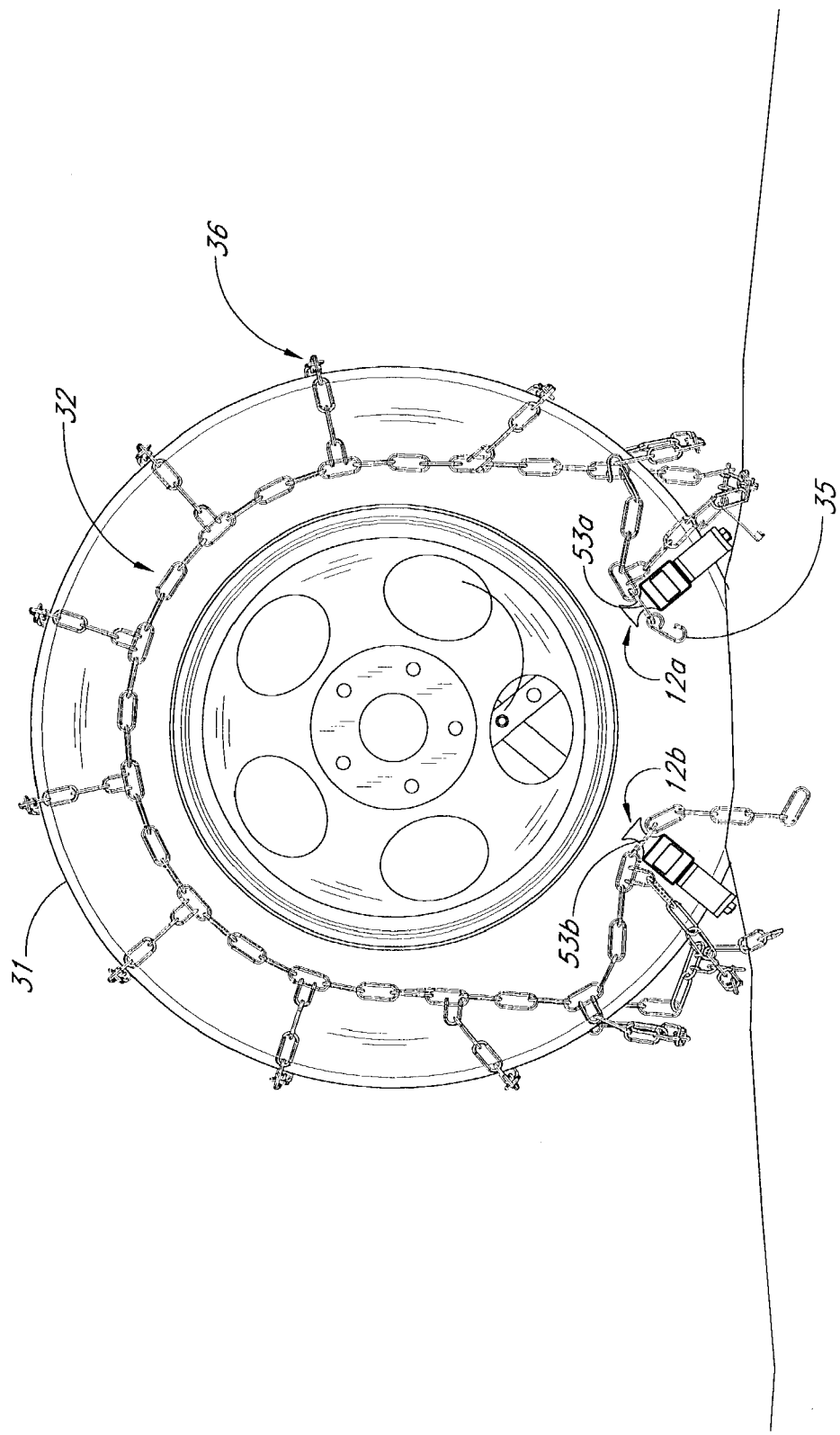
FIG. 6 illustrates in a side elevation the inside of a motor vehicle wheel and the positions of the two J-shaped crossover members after the embodiment shown in FIGS. 1 and 2 is attached to the chain.
Figure 11:
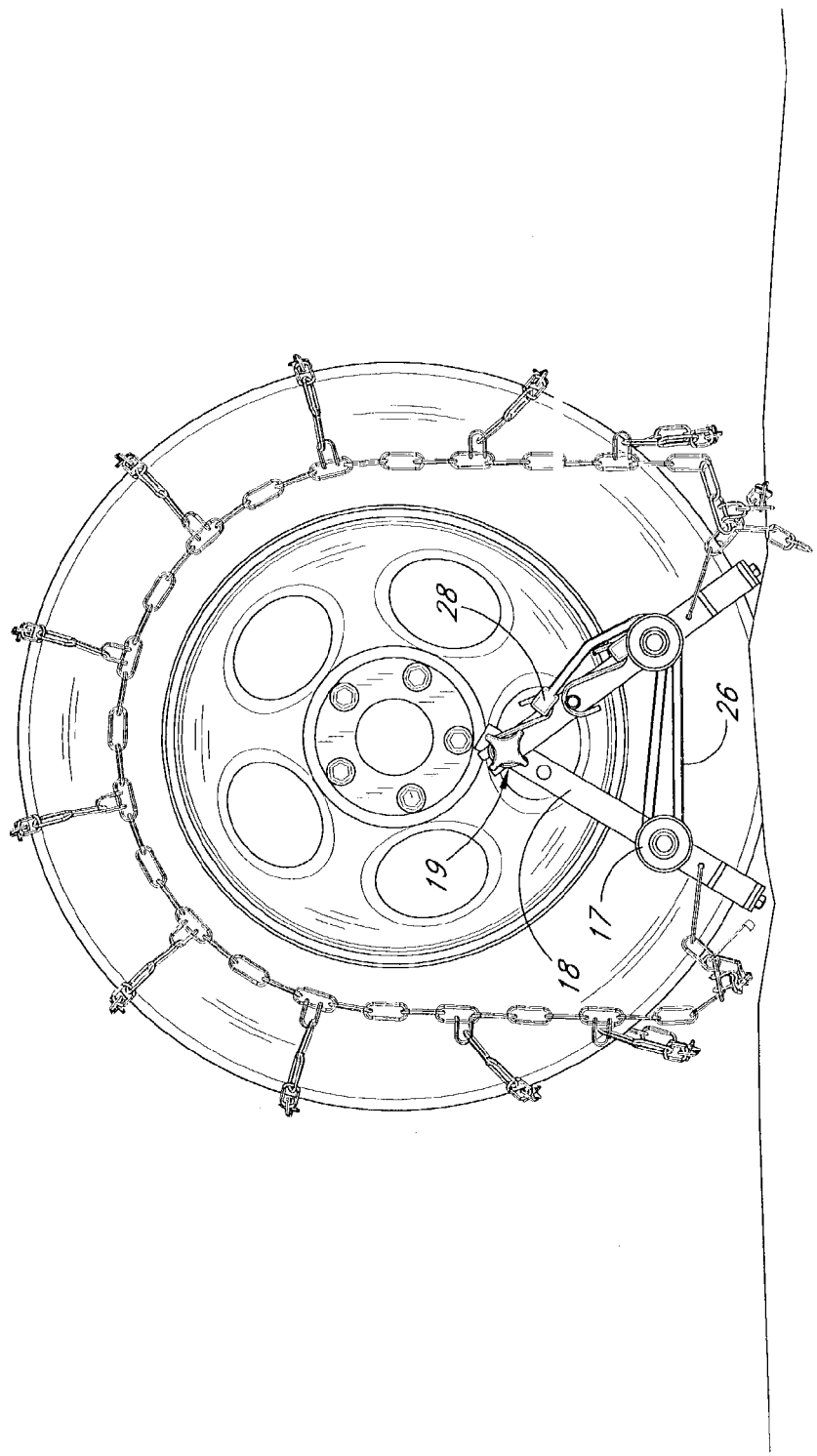
FIG. 11 illustrates in a side elevation the outside of a motor vehicle wheel and the attachment of the other end of one embodiment of the tensioning to one embodiment of the tightening assembly.

After the tire chain 30 has been attached as illustrated in FIGS. 5 and 6, the first and second J-shaped crossover members 1 and 2 are then slot connected and the tightening assembly 19 is attached, as illustrated in FIG. 11. In one embodiment, best depicted in FIG. 5, the threaded pin portion 21 is fitted into the notch portion 22. In this embodiment, the threaded knob 23 is then screwed onto the threaded pin 21 and is hand-tightened as much as possible, as illustrated in FIG. 7.

Figure 7:
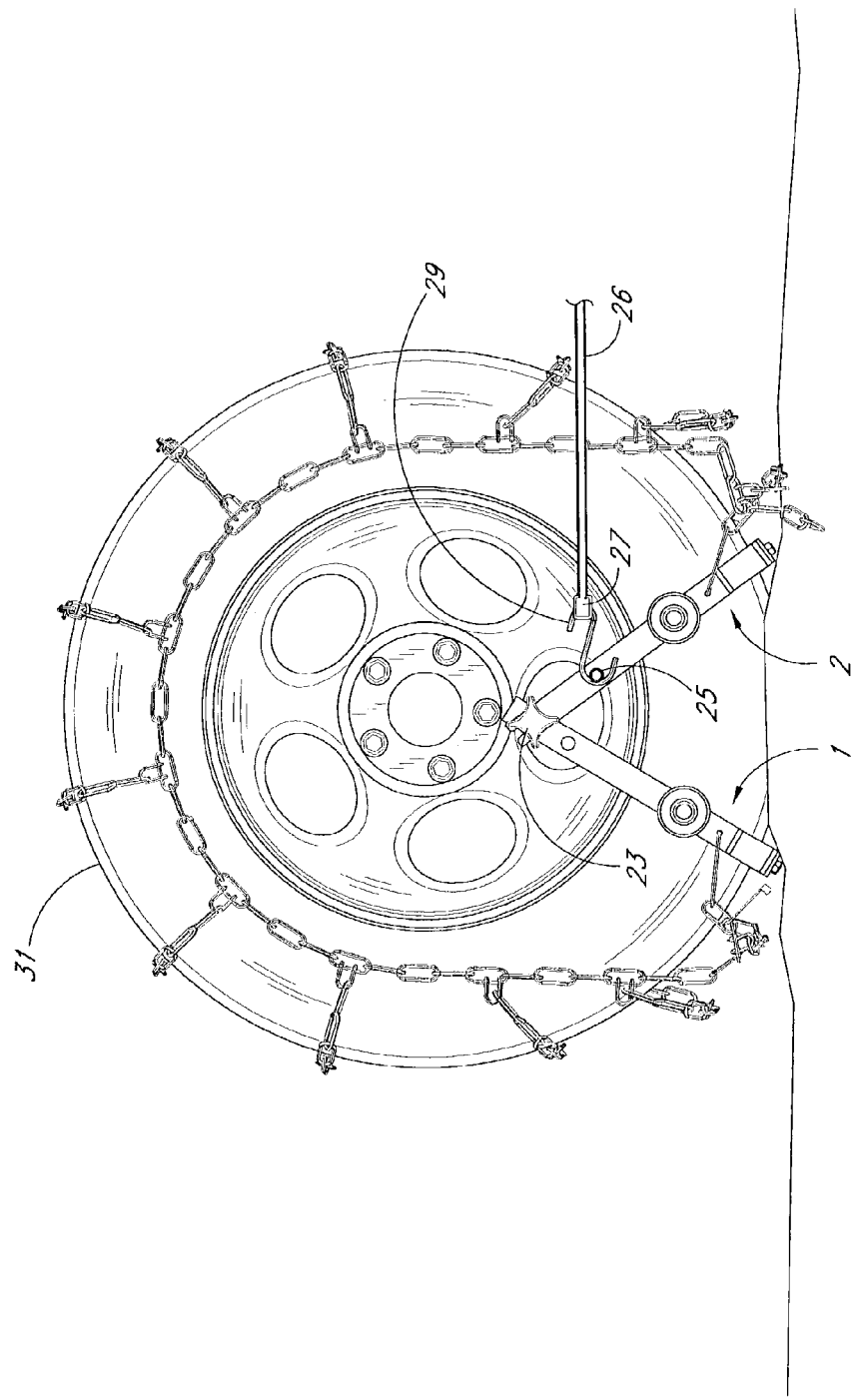
FIG. 7 illustrates in a side elevation the outside of a motor vehicle wheel and the attachment of one end of one embodiment of the tension device to one embodiment of the protruding attachment portion.
Figure 8:
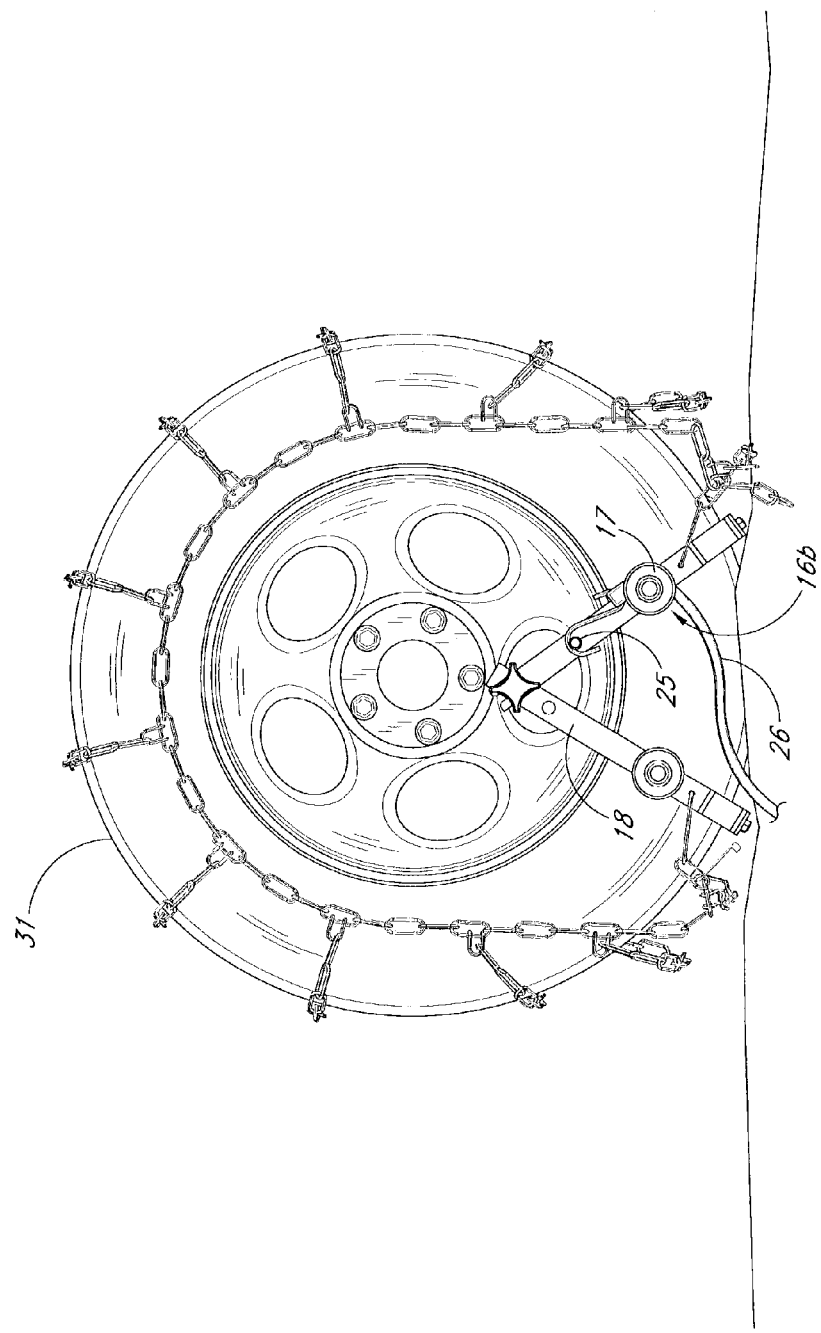
FIG. 8 illustrates in a side elevation the outside of a motor vehicle wheel and the wrapping of one embodiment of the tensioning device about one embodiment of the first protruding tension strap wrapping member.
Figure 9:
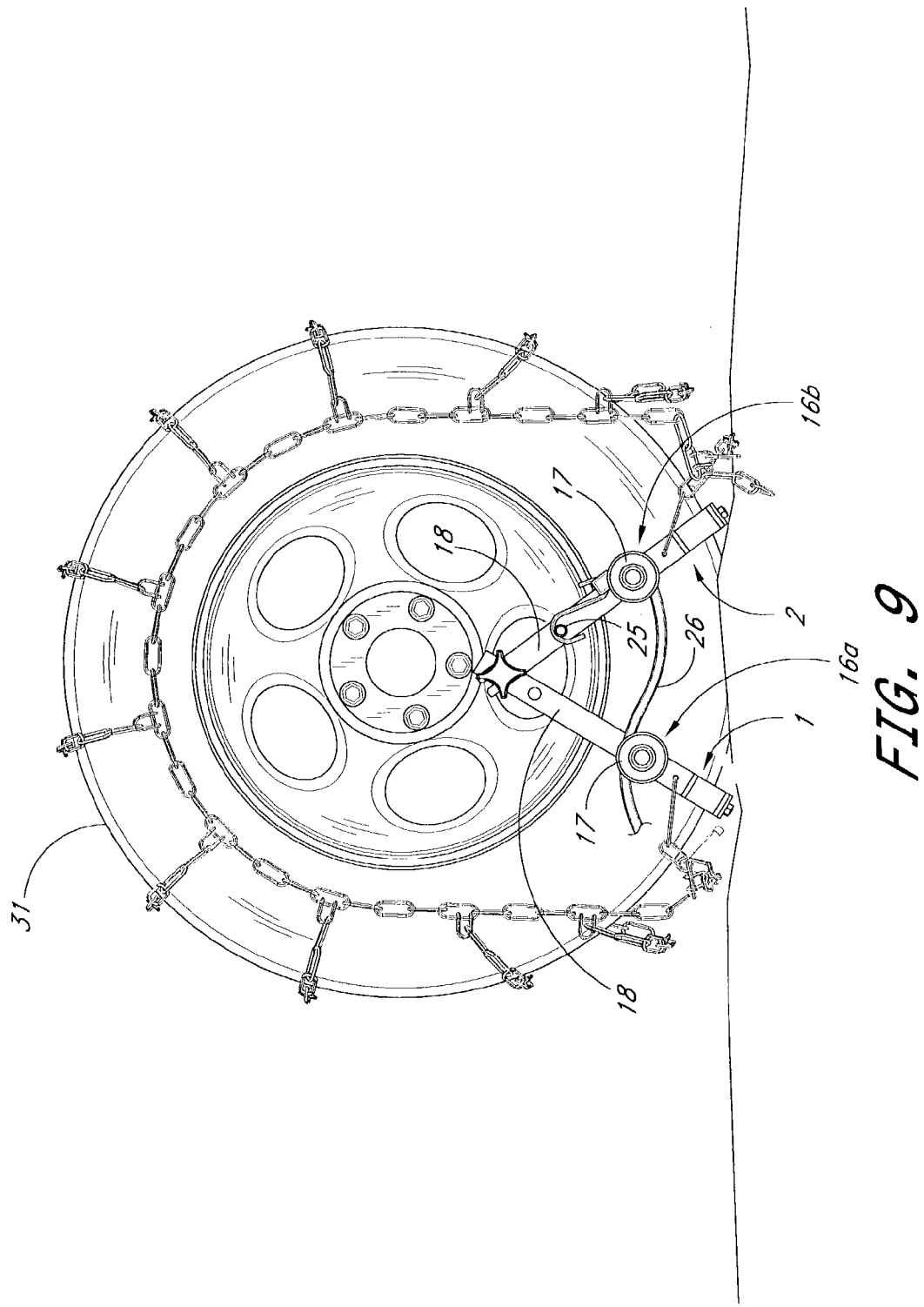
FIG. 9 illustrates in a side elevation the outside of a motor vehicle wheel and the wrapping of one embodiment of the tensioning device about one embodiment of the second protruding tension strap wrapping member.
Figure 10:
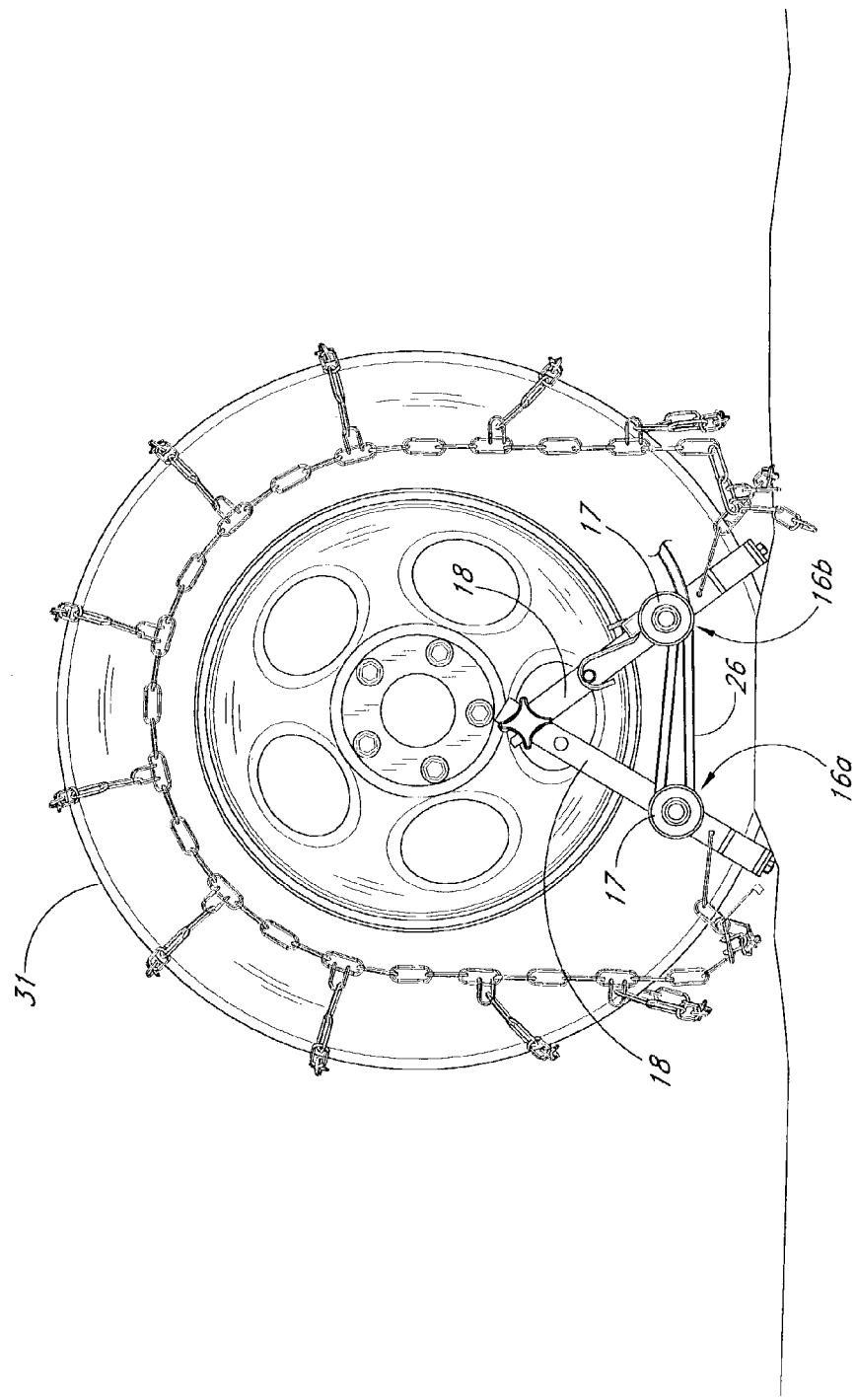
FIG. 10 illustrates in a side elevation the outside of a motor vehicle wheel and the second wrapping of one embodiment of the tensioning device about one embodiment of the protruding tension strap wrapping member.

After the tightening assembly 19 is in place, the user attaches the first end portion 27 of the tension strap 26 to the protruding attachment portion 25 on the second J-shaped crossover member 2, as illustrated in FIG. 7. The user then wraps the tension strap 26 around the second tension strap protruding wrapping member 16b, which is located on the second J-shaped crossover member 2, as illustrated in FIG. 8. The user then wraps and stretches the tension strap 26 around the first protruding tension strap wrapping member 16a, which is located on the first J-shaped crossover member 1, as depicted in FIG. 9. The user then stretches and wraps the tension strap 26 a second time around the second protruding tension strap wrapping member 16b, as illustrated in FIG. 10. As shown in FIGS. 8–11, when the user stretches and wraps the tension strap 26 around each of the first and second protruding tension strap wrapping members 16a and 16b, the tension strap 26 is wrapped between the large diameter washer-like portions 17 and the front surfaces 18 of the J-shaped crossover members 1 and 2. Thus, the large diameter washer-like portions 17 prevent the strap 26 from slipping off of each of the first and second protruding wrapping members 16a and 16b. Other configurations also can be used, such as slotted posts and the like. Finally, the user stretches and attaches the second end portion 28 of the tension strap 26 to the tightening assembly 19, as illustrated in FIG. 11. In one embodiment, the attachment of the stretched tension strap 26 to the tightening assembly 19 helps to hold the J-shaped crossover member 1 tightly against the J-shaped crossover member 2 by forcing the threaded pin portion 21 into the notch portion 22.

It will be understood that as the tension strap 26 is stretched and wrapped around the first and second protruding tension strap wrapping members 16a and 16b and stretched and attached to the tightening assembly 19, the first and second J-shaped crossover members 1 and 2 are put in considerable tension. Although the first and second J-shaped crossover members 1 and 2 are naturally inclined to pivot together about the threaded pin 21 because of the tension provided by the tension strap 26, said first and second J-shaped crossover members 1 and 2 cannot pivot because, as noted above, each of the J-shaped crossover members is wedged between the tire 31 and the ground or snow.

Figure 12:
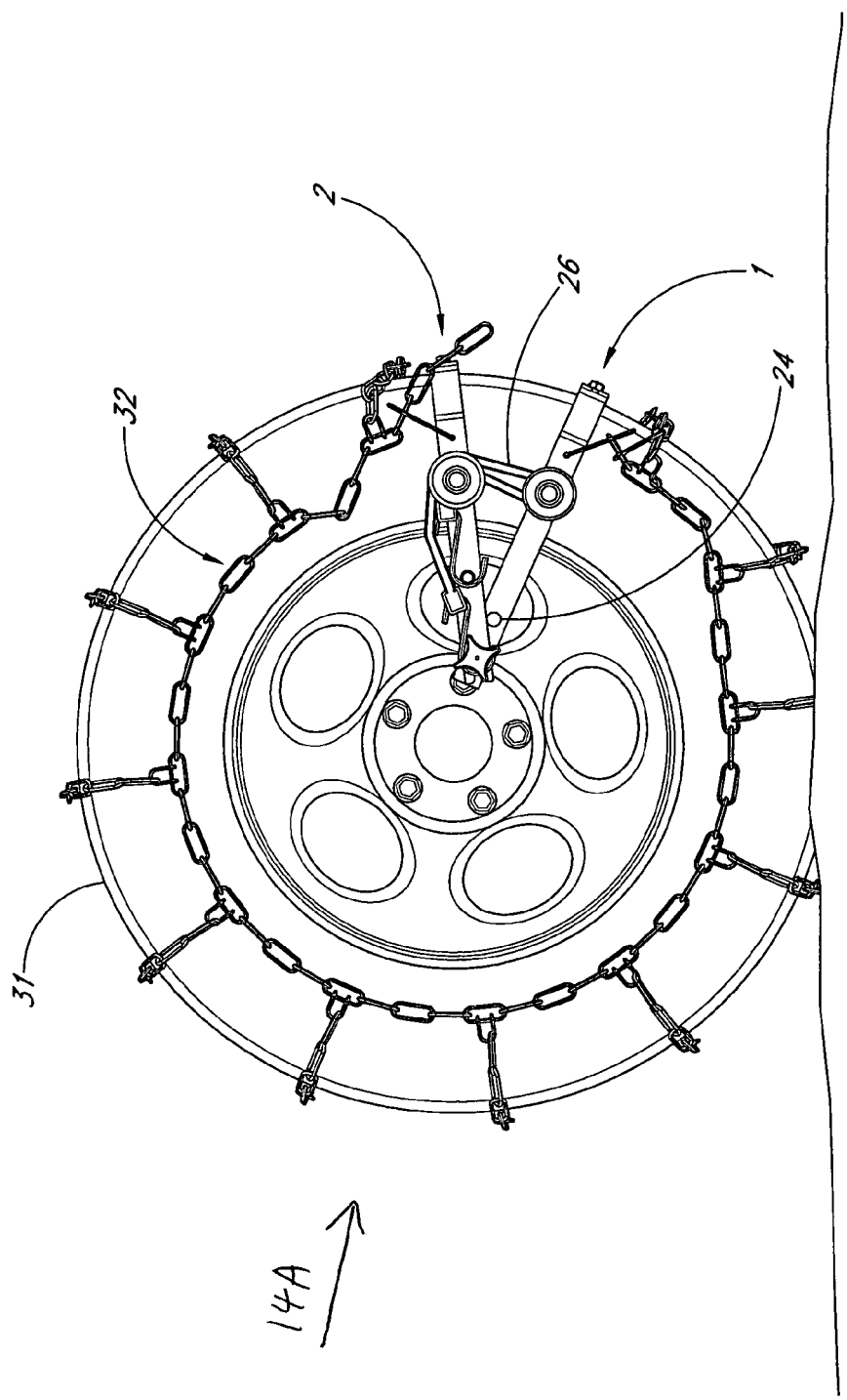
FIG. 12 illustrates in a side elevation the outside of a motor vehicle wheel and the positions of the two J-shaped crossover members and the tire chain after the motor vehicle wheel has been rotated approximately one quarter turn and the crossovers have collapsed.
Figure 13:
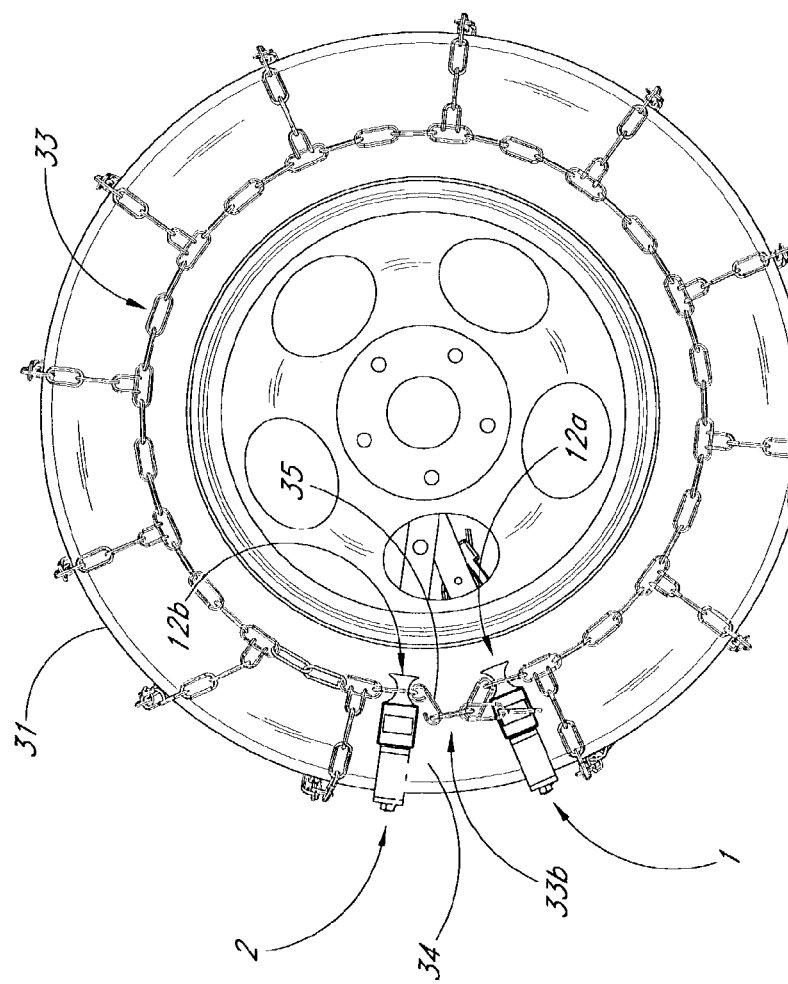
FIG. 13 illustrates in a side elevation the inside of a motor vehicle wheel and the positions of the two J-shaped crossover members and the tire chain after the motor vehicle wheel has been rotated approximately one quarter turn, the crossovers have collapsed, and the inner links of the tire chain have been attached.

Thus, when the user moves the motor vehicle such that the tire 31 rotates, said first and second J-shaped crossover members 1 and 2 are no longer wedged between the tire 31 and the ground or snow, and are thus automatically caused to pivot toward each other about the threaded pin 21 as a result of the tension provided by the tension strap 26, which pulls said first and second J-shaped crossover members 1 and 2 toward each other from their original spread-open position shown in FIG. 11 into a collapsed position shown in FIGS. 12 and 13. As illustrated in FIGS. 12 and 13, once the user has moved the motor vehicle such that the tire 31 rotates approximately 30 to 45 degrees, the tension strap 26 has contracted and said first and second J-shaped crossover members 1 and 2 have collapsed. Other degrees of rotation also may be sufficient. Contraction of the tension strap 26 causes the first J-shaped crossover member 1 and the second J-shaped crossover member 2 to counter-rotate about the threaded pin 21 until the bump portion 24 engages the second J-shaped crossover member 2. When the bump portion 24 has engaged the second J-shaped crossover member 2, the counter-rotation of the first J-shaped crossover member 1 and the second J-shaped crossover member 2 has brought the inner link attachment portions 12a and 12b closer together, as depicted in FIG. 13, such that the tire chain hook 35 is easily attachable to one of the chain links 34 near the opposing end portion 33b of the inner circumferential link portion 33. The inner link attachment portions 12a and 12b also hold the tire chain hook 35 and the chain links 34 near the opposing end portion 33b of the inner circumferential link portion 33 above the level of the snow. Thus, the user reaches around the tire 31 and attaches the tire chain hook 35 to one of the chain links 34 near the opposing end portion 33b of the inner circumferential link portion 33.

The user then loosens the knob 23 to separate the first and second crossovers 1 and 2 from one another to allow their removal from the inner links 52b and 53b, as illustrated in FIG. 3. Once the user has attached the inner tire chain hook 35 to one of the chain links 34 near the opposing end portion 33b of the inner circumferential link portion 33 and removed the first and second crossover members 1 and 2, the final step is for the user to attach the outer tire chain hook 35 to one of the chain links 34 near the opposing end portion 32b of the outer circumferential link portion 32, which is performed in the normal manner. In one preferred embodiment of the invention, the tire chain 30 is attached securely enough that there is no need for the driver to stop a second time to retighten it. The user may then repeat the process using the same set of first and second J-shaped crossover members 1 and 2 on other tires as necessary.

In one preferred embodiment, the first and second J-shaped crossover members 1 and 2 are made from 1/8" cold rolled steel to prevent them from twisting as the tire 31 rotates. In another embodiment, the first and second J-shaped crossover members 1 and 2 are made from plastic. Other sufficiently rigid materials also can be used.

The terms and expressions that have been employed within this specification are used as terms of description and not of limitation. There is no intention in the use of such terms and expressions of excluding any equivalents of the features shown and described or portions thereof. Instead, it is recognized that various modifications are possible within the scope of the invention claimed. At times modifications of or alternatives to certain features have been explicitly described. The descriptions of modifications or alternatives for some features should not be read to exclude other modifications or alternatives not so described, nor should the lack of description of modifications or alternatives for other features be read to exclude such. Accordingly, not all of the features, aspects and/or advantages are necessarily required to practice the present invention, thus the scope of the present invention should be limited only by a fair reading of the following claims.

What is claimed is:

1. A method for quickly and conveniently attaching a tire chain to a vehicle tire of a vehicle, in which the ends of the tire chain are automatically brought together after the chain is placed on the tire and without any need to (i) jack the wheel of the vehicle tire off the ground or (ii) crawl under the vehicle, the method comprising:

placing said tire chain over a top of said vehicle tire with the respective ends of said tire chain touching the ground;

lifting an inner end and an outer end of a first end of said tire chain off of the ground and attaching said inner and outer ends of said first end of said tire chain to a first crossover member;

positioning a bottom of said first crossover member between said tire and the ground;

lifting an inner end and an outer end of a second end of said tire chain off of the ground and attaching said inner and outer ends of said second end of said tire chain to a second crossover member;

positioning a bottom of said second crossover member between said tire and the ground;

attaching together said first and second crossover members at a pivot point on an outward facing side of said tire;

stretching a tension member between said first and second crossover members;

driving said vehicle a sufficient distance but less than a full rotation of said tire to rotate said crossover members above the ground so that said tension member automatically pivots said crossover members toward each other to draw said respective ends of said tire chain together;
attaching said inner ends of said first and second ends of said tire chain together;
removing said crossover members from said tire chain and said tire; and
attaching said outer ends of said first and second ends of said tire chain together, after removing said crossover members.

2. A method for quickly and conveniently attaching a tire chain to a vehicle tire of a vehicle, in which a first end and a second end of the tire chain are automatically brought together after said tire chain is placed on the tire and said vehicle tire is rotated, the method comprising:
placing a tire chain over a top of a vehicle tire with said first and said second ends of said tire chain touching the ground;
lifting an inner and an outer end of said first end of said tire chain off of the ground and attaching said inner and outer ends of said first end of said tire chain to a first member;
positioning a bottom of said first member adjacent said tire;
lifting an inner and an outer end of said second end of said tire chain off of the ground and attaching said inner and outer ends of said second end of said tire chain to a second member;
positioning the bottom of said second member adjacent said tire;
attaching together said first and second members;
stretching a tension member between said first and second members;
rotating said tire sufficiently to allow said stretched tension member to pivot automatically said members toward each other to draw said first and second ends of said tire chain together;
attaching said inner ends of said first and second ends of said tire chain together;
removing said members from said tire chain and said tire; and
attaching said outer ends of said first and second respective ends of said tire chain together, after removing said members from said tire chain and said tire.

3. A method for quickly and conveniently attaching a tire chain to a vehicle tire, the method comprising:
placing a tire chain over the top of a vehicle tire with the first and second ends of said tire chain in front of and behind said tire;
lifting an inner end and an outer end of said first end of said tire chain and attaching said inner and outer ends of said first end of said tire chain to a first member;
positioning a bottom of said first member adjacent said tire;
lifting an inner end and an outer end of said second end of said tire chain and attaching said inner and outer ends of said second end of said tire chain to a second member;
positioning a bottom of said second member adjacent said tire;
attaching together said first and second members;
stretching a tension member between said first and second members;
rotating said tire sufficiently to allow said stretched tension member automatically to pivot said first and second members toward each other to draw said first and second ends of said tire chain together;
attaching said inner ends of said first and second ends of said tire chain together;
removing said members from said tire chain and said tire; and
attaching said outer ends of said first and second ends of said tire chain together, after removing said members from said tire chain and said tire.

4. A method for attaching a tire chain to a vehicle tire, the method comprising:
attaching inner and outer end portions of a tire chain to a first crossover member, said
first crossover member suitably adapted to engage said inner and outer end portions of said tire chain;
placing said first crossover member between a first portion of said tire and the surface on which said tire rests;
repeating said attachment and placing steps with a second crossover member;
attaching said first and second crossover members to one another at a pivot point;
tensioning said first and second crossover members with a tensioning device;
rotating said tire so that said first and second crossover members pivot about said pivot point in response to the tension produced by said tension device;
reaching behind said tire to attach said end portions of said inner end portions of said tire chain;
removing said first and second crossover members from said tire chain; and
attaching said outer end portion of said tire chain to create a secure attachment of said tire chain to said tire, after removing said first and second crossover members.

5. The method recited in claim 4, wherein said tensioning device is a tension strap.

6. The method recited in claim 5, wherein said tension strap is made of rubber.

7. The method recited in claim 5, wherein said tension strap has a hook portion at one end.

8. The method recited in claim 5, wherein said tension strap has a loop portion at one end.

9. The method recited in claim 4, wherein said first and second crossover members include attachment portions suitably adapted to engage said inner end portions of said tire chain.

10. A method for attaching a tire chain to a vehicle tire, the method comprising:
attaching inner and outer end portions of a tire chain to a first crossover member, said
first crossover member suitably adapted to engage said inner and outer end portions of said tire chain;
placing said first crossover member between a first portion of said tire and the surface on which said tire rests;
repeating said attachment and placing steps with a second crossover member;
attaching said first and second crossover members to one another at a pivot point;
tensioning said first and second crossover members with a tensioning device;
rotating said tire so that said first and second crossover members pivot about said pivot point in response to the tension produced by said tension device;
reaching behind said tire to attach said end portions of said inner end portions of said tire chain;
removing said first and second crossover members from said tire chain; and
attaching said outer end portion of said tire chain to create a secure attachment of said tire chain to said tire, wherein said first and second crossover members include attachment portions suitably adapted to engage said inner end portions of said tire chain, and wherein said attachment portions on a first side of said tire are closer together than said attachment portions on a second side of said tire, such that said tire chain is biased toward said first side of the tire when installed on said tire.

11. The method recited in claim 9, wherein said attachment portions on a first side of said tire are shaped so as to orient links of said tire chain for easy attachment.

12. A method for attaching a tire chain to a vehicle tire, the method comprising:
 attaching inner and outer end portions of a tire chain to a first crossover member, said
 first crossover member suitably adapted to engage said inner and outer end portions of said tire chain;
 placing said first crossover member between a first portion of said tire and the surface on which said tire rests;
 repeating said attachment and placing steps with a second crossover member;
 attaching said first and second crossover members to one another at a pivot point;
 tensioning said first and second crossover members with a tensioning device;
 rotating said tire so that said first and second crossover members pivot about said pivot point in response to the tension produced by said tension device;
 reaching behind said tire to attach said end portions of said inner end portions of said tire chain;
 removing said first and second crossover members from said tire chain; and
 attaching said outer end portion of said tire chain to create a secure attachment of said tire chain to said tire, wherein said first and second crossover members each includes a flange to prevent links of said tire chain from sliding down said first and second crossover members.

13. The method recited in claim 4, wherein each of said first and second crossover members is generally shaped like the letter J.

14. The method recited in claim 4, wherein each of said first and second crossover members is made from metal.

15. The method recited in claim 14, wherein said metal is cold rolled steel.

16. The method recited in claim 4, wherein each of said first and second crossover members is made from plastic.

17. A tire chain mounting device comprising:
 a tensioning device;
 a first crossover member, said first crossover member including inner and outer portions suitably adapted to engage inner and outer end portions of a tire chain, respectively, the inner and outer portions of the first crossover member being spaced at a first distance, wherein the first crossover member is configured to allow the first distance to be adjusted, and said first crossover member suitably adapted to engage said tensioning device; and
 a second crossover member, said second crossover member including inner and outer portions suitably adapted to engage inner and outer end portions of a tire chain, respectively, the inner and outer portions of the second crossover member being spaced at a second distance, wherein the second crossover member is configured to allow the second distance to be adjusted, suitably adapted to engage inner and outer end portions of said tire chain, and said second crossover member suitably adapted to engage said tensioning device;
 wherein said first and said second crossover members are pivotally attachable to one another, and wherein each of said crossover members includes a shoulder to prevent links of said tire chain from sliding down said crossover member.

18. A tire chain mounting device comprising:
 a tensioning device;
 a first crossover member, said first crossover member suitably adapted to engage inner and outer end portions of a tire chain, and said first crossover member suitably adapted to engage said tensioning device;
 a second crossover member, said second crossover member suitably adapted to engage inner and outer end portions of said tire chain, and said second crossover member suitably adapted to engage said tensioning device;
 wherein said first and said second crossover members are pivotally attachable to one another, wherein said first and second crossover members include attachment portions suitably adapted to engage said inner end portions of said tire chain, and wherein said attachment portions on a first side of said tire are closer together than said attachment portions on a second side of said tire, such that said tire chain is biased toward said first side of the tire when installed on using said tire chain mounting device.

19. A tire chain mounting device comprising:
 a tensioning device;
 a first crossover member, said first crossover member suitably adapted to engage inner and outer end portions of a tire chain, and said first crossover member suitably adapted to engage said tensioning device;
 a second crossover member, said second crossover member suitably adapted to engage inner and outer end portions of said tire chain, and said second crossover member suitably adapted to engage said tensioning device;
 wherein said first and said second crossover members are pivotally attachable to one another;
 wherein said first and second crossover members include attachment portions comprising upwardly extending projections suitably adapted to engage said inner end portions of said tire chain in a manner in which said upwardly extending projections extend through said inner end portions of said tire chain, said upwardly extending projections also being configured to allow said inner end portions of said tire chain to be disengaged from said upwardly extending projections by lifting said inner end portions of said tire chain upwardly off of the upwardly extending projections, and wherein each of said crossover members includes a shoulder to prevent links of said tire chain from sliding down said crossover member;
 wherein said attachment portions on a first side of said tire are shaped so as to orient links of said tire chain for easy attachment to each other.

* * * * *